(12) United States Patent
Kröner

(10) Patent No.: US 7,815,375 B2
(45) Date of Patent: Oct. 19, 2010

(54) BEARING ARRANGEMENT FOR A MOTOR VEHICLE

(75) Inventor: Gregor Kröner, Bischberg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 1275 days.

(21) Appl. No.: 10/561,741

(22) PCT Filed: Jun. 14, 2004

(86) PCT No.: PCT/DE2004/001247

§ 371 (c)(1),
(2), (4) Date: Dec. 20, 2005

(87) PCT Pub. No.: WO2005/005847

PCT Pub. Date: Jan. 20, 2005

(65) Prior Publication Data

US 2006/0171621 A1 Aug. 3, 2006

(30) Foreign Application Priority Data

Jun. 25, 2003 (DE) ................. 103 29 237

(51) Int. Cl.
*F16C 11/04* (2006.01)
(52) U.S. Cl. .................... 384/295; 29/898.07; 29/515
(58) Field of Classification Search ............... 384/295; 29/898.051, 898.07, 505, 515, 516
See application file for complete search history.

(56) References Cited

U.S. PATENT DOCUMENTS

| 1,588,159 | A | * | 6/1926 | Bolgiano ................. 474/136 |
| 2,644,350 | A | * | 7/1953 | Regimbald ............... 408/241 R |
| 3,318,169 | A | * | 5/1967 | Tronslien ..................... 74/432 |
| 3,465,405 | A | * | 9/1969 | Sullivan ................. 29/898.043 |
| 4,125,298 | A | * | 11/1978 | Heurich et al. ............... 384/537 |
| 4,979,263 | A | | 12/1990 | Tölle |
| 5,586,833 | A | | 12/1996 | Vossmann et al. |

FOREIGN PATENT DOCUMENTS

| DE | 43 40 696 C1 | 6/1995 |
| DE | 196 02 926 C1 | 5/1997 |
| DE | 196 24 979 C2 | 1/1998 |
| DE | 197 31 305 A1 | 2/1999 |
| DE | 197 56 728 A1 | 6/1999 |
| DE | 101 55 398 C1 | 12/2002 |

OTHER PUBLICATIONS

English translation of International Preliminary Examination Report for corresponding PCT application No. PCT/DE2004/001247, dated May 11, 2006.
International Search Report, Dated Nov. 22, 2004, Corresponding to PCT/DE2004/001247.

* cited by examiner

*Primary Examiner*—William C Joyce
(74) *Attorney, Agent, or Firm*—Christie, Parker & Hale LLP

(57) ABSTRACT

A bearing arrangement for an adjusting device in a motor vehicle comprises a bearing point in the form of a bearing opening of a base part and a bearing element extending through said bearing opening. The base part arranged on the edge of the bearing opening comprises at least one deformation area which protrudes in a radial manner from the edge to the inside and which acts as radial supports for the bearing element.

18 Claims, 6 Drawing Sheets

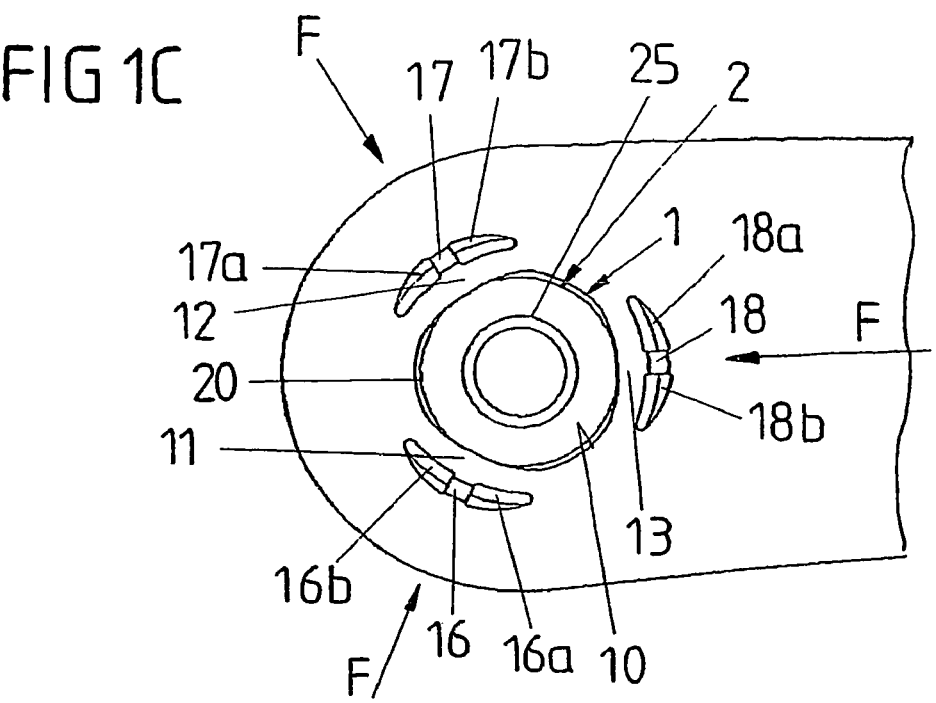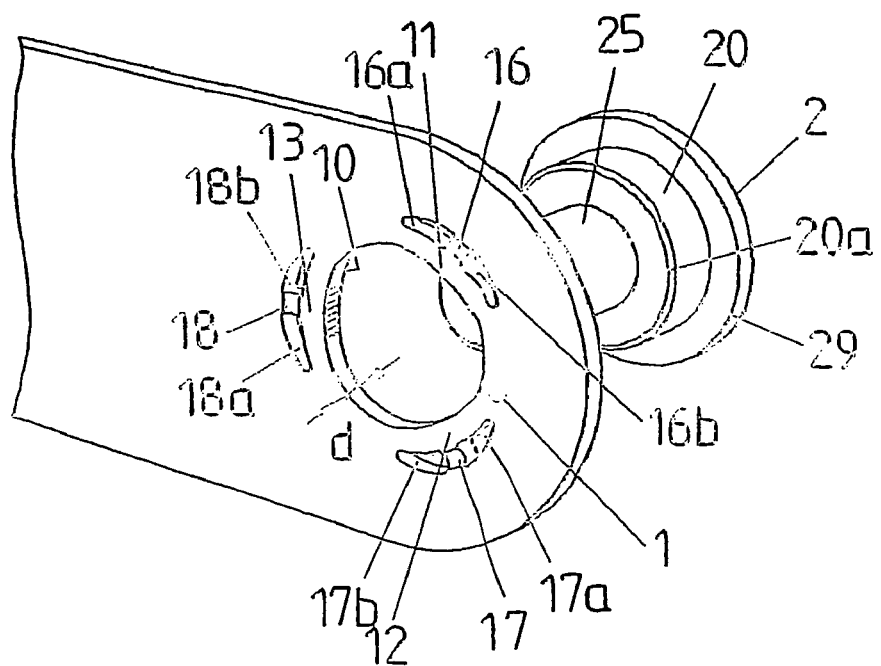

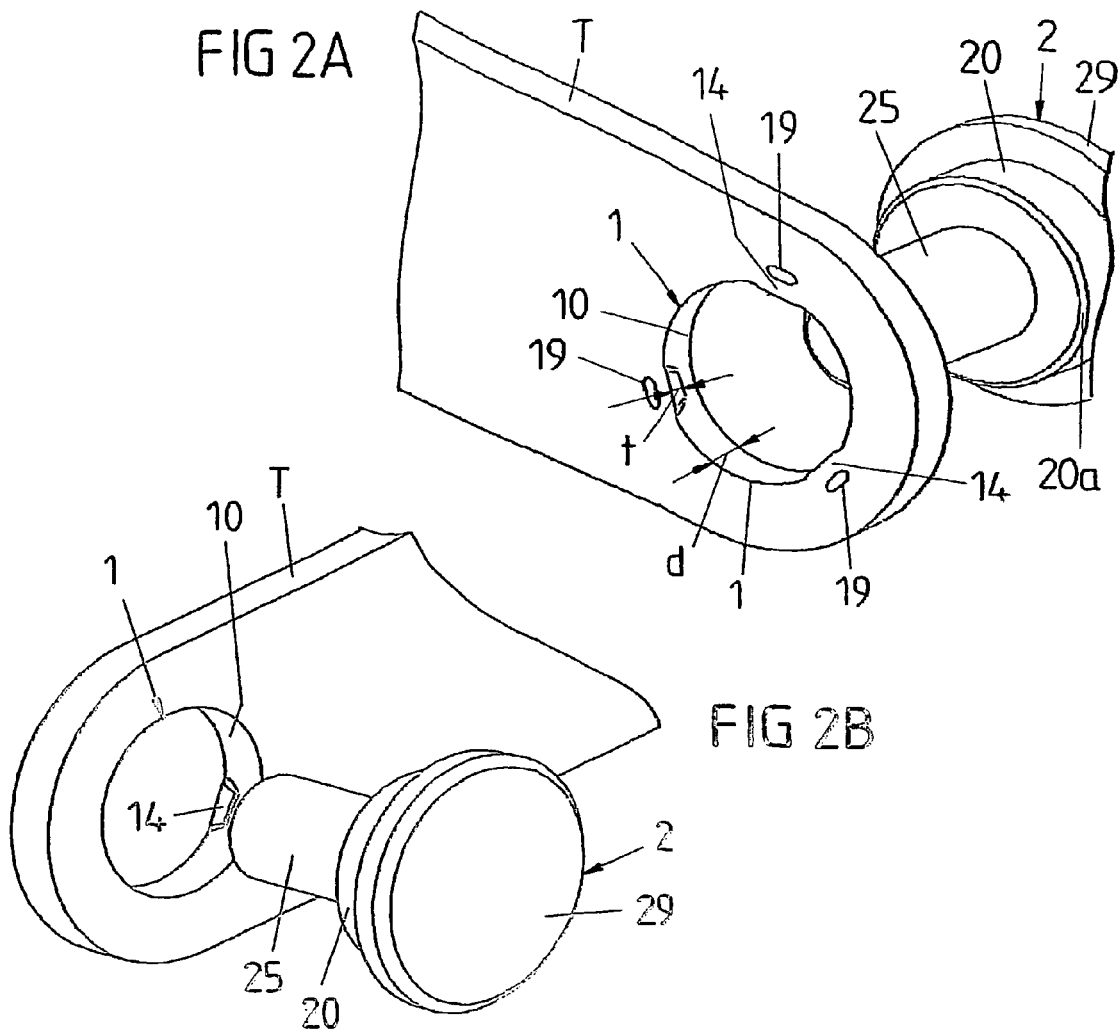
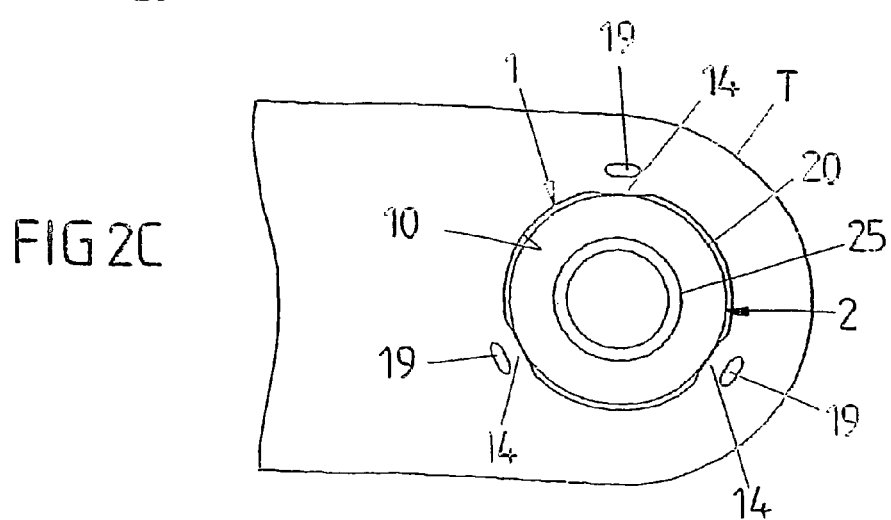

BEARING ARRANGEMENT FOR A MOTOR VEHICLE

CROSS-REFERENCE TO A RELATED APPLICATION

This application is a National Phase Patent Application of International Application Number PCT/DE2004/001247, filed on Jun. 14, 2004, which claims priority of German Patent Application Number 103 29 237.3, filed on Jun. 25, 2003.

BACKGROUND

The invention relates to a bearing arrangement for a motor vehicle.

A bearing arrangement of this kind comprise a bearing point in the form of a bearing opening of a base part which can be for example an adjusting lever or a support part (seat side part) of a motor vehicle seat, as well as a bearing element, e.g. in the form of a bearing bolt, passing axially through the bearing opening.

A bearing arrangement of this kind is particularly suitable for forming a radial bearing for a bearing element of an adjusting device in motor vehicles, e.g. for a bearing bolt of a seat adjuster. The bearing should not be affected as far as possible by tolerances in order to avoid play and bearing noises. For this it is known to use a bearing bolt provided with a cutter which automatically works its way into the corresponding bearing point. However this has the drawback of increased costs for the bearing element (bearing bolt with cutter) as well as an expensive assembly.

The object of the invention is therefore to improve a bearing arrangement of the type mentioned at the beginning, more particularly with a view to simplified production and assembly whilst avoiding tolerances.

BRIEF DESCRIPTION

According to this, the base part has on the edge of the bearing opening at least one deformation area (formed through plastic deformation) which protrudes radially inwards from the edge of the bearing opening and (in order to form a radial bearing) acts as a radial support point for the bearing element.

The invention is based on the knowledge that a (radial) bearing of a bearing element (preferably in the form of a bearing bolt) substantially unaffected by tolerances in a bearing opening can be achieved if on the edge of the bearing opening there are (radially) inwardly protruding deformation areas which act as radial support points for the bearing element.

According to a first variation for providing the bearing arrangement according to the invention, the bearing element is inserted in the bearing opening before the deformation areas are deformed so that they protrude inwards from the edge of the bearing opening. The cross sectional dimensions of the bearing element on the one side and the bearing opening on the other are thereby matched with each other so that the bearing element is mounted with radial play in the bearing opening. A restricted deformation of the edge of the bearing opening then takes place in the deformation areas until these bear against the bearing element whilst completely compensating the radial play. According to a second variation for providing the bearing arrangement according to the invention the deformation areas are already deformed prior to insertion of the bearing element into the bearing opening so that they protrude (radially) inwards (toward the centre of the bearing opening), namely so far that taking into account the inwardly protruding deformation areas the cross sectional area (internal diameter) of the bearing opening available for inserting the bearing element into the bearing opening is slightly smaller than the cross-sectional dimensions of the bearing element. When subsequently inserting the bearing element into the bearing opening the deformation areas deform back such that the bearing element is mounted without play in the bearing opening under a certain elastic tension.

With the bearing arrangement according to the invention the bearing opening thus has as such, without the radially inwardly protruding deformation areas, an oversize in the cross-sectional dimension or in its diameter so that the bearing element would be mounted there with considerable play—without allowing for the inwardly protruding deformation areas. Only through the inwardly protruding deformation areas which are deformed during or after insertion of the bearing element into the bearing opening so that they bear precisely against the outer surface of the bearing element and act there as radial support points is the radial bearing completed.

For this the at least one deformation area which protrudes inwards from the edge of the bearing opening to form a radial support point for the bearing element, has in comparison with the further radially not inwardly displaced edge regions of the bearing opening (as well as in comparison with the bearing element) a lower stiffness to radially acting forces, i.e. under the action of a predetermined radial force it becomes deformed earlier than the remaining edge regions (or bearing element).

More particularly the at least one deformation area of the bearing opening is defined at least in part through at least one weakened area of the base part so that the deformation area extends between this weakened area and the bearing opening.

Several deformation areas can be mounted side by side along the edge of the bearing opening to surround the bearing opening along its entire perimeter or to extend only over a part of the perimeter of the bearing opening, namely in particular along such a part on which the lower radial forces act when the bearing is in operation.

The weakened areas associated with the deformation areas can be formed for example through recesses in the base part. According to one embodiment which is particularly preferred in the case of thin base parts (with a thickness of less than 2 mm), the relevant recess is designed as a through opening which engages through the base part. According to another embodiment which is preferred when using thicker base parts, the recess is formed as a recess in the form of a material displacement point which engages in the base part but does not pass right through same. The depth of the relevant associated recess (material displacement point) determines the size of the deformation area as well as in particular its deformability and bearing capacity.

According to a further development of the invention, particularly for thin base parts, each deformation area of the bearing opening is assigned two weakened areas separated from each other through a web whereby the deformation area extends between the web and the bearing opening. The web thereby serves to couple the deformation area to further areas of the base part, more particularly to transfer radially acting forces, and can at the same time allow a sufficient deformability of the deformation area so that the bearing play can be completely compensated.

The bearing element itself is preferably constructed so that it has on the one hand a bearing section which serves for the radial bearing of the bearing element in the bearing opening, as well as on the other a connecting section, e.g. in the form of an external thread through which the bearing element can be connected to a further structural assembly.

One method for manufacturing a bearing arrangement according to the invention is characterised through the features of patent claim 20. According to this the at least one deformation area of the bearing opening is plastically deformed so that it acts as a radial support for a play-free bearing of the bearing element. ("Play-free" here means that throughout there should still be a relative rotational movement of the bearing element and bearing opening but the bearing opening should radially support the bearing element "without rattling").

According to one variation of the method according to the invention the deformation area is after insertion of the bearing element deformed radially inwards by a tool, e.g. by a prick punch so that it radially supports the bearing element.

According to another variation of the method according to the invention before axially inserting the bearing element into the bearing opening the deformation areas already protrude radially inwards from the bearing opening, namely so that the bearing element has an oversize in respect of the cross-sectional area of the bearing opening available—taking into account the inwardly protruding deformation areas—.

In this case the deformation areas on inserting the bearing element into the bearing opening are deformed again in part radially outwards so that an optimum (play-free) seat of the bearing element is automatically set in the bearing opening whereby a residual elastic tension remains.

BRIEF DESCRIPTION OF THE DRAWINGS

Further features and advantages of the invention will now be explained below in the following description of embodiments with reference to the drawings.

FIG. 1c is a view of the bearing arrangement of FIG. 1 after radial deformation of the edge of the bearing opening.

FIG. 1d is an exploded view of the bearing arrangement of FIG. 1c.

FIG. 2a is a perspective view of a second embodiment of a bearing arrangement with an adjusting lever of a motor vehicle seat having a bearing opening, and an associated bearing bolt in a perspective view.

FIG. 2b is a second perspective view of the bearing arrangement of FIG. 2a.

FIG. 2c is a view of the bearing arrangement of FIGS. 2a and 2b after inserting the bearing bolt axially into the bearing opening whereby areas of the edge of the bearing opening were deformed radially outwards.

FIG. 3b is a sectional view through the bearing opening of FIG. 3a.

DETAILED DESCRIPTION

Figure 1A:
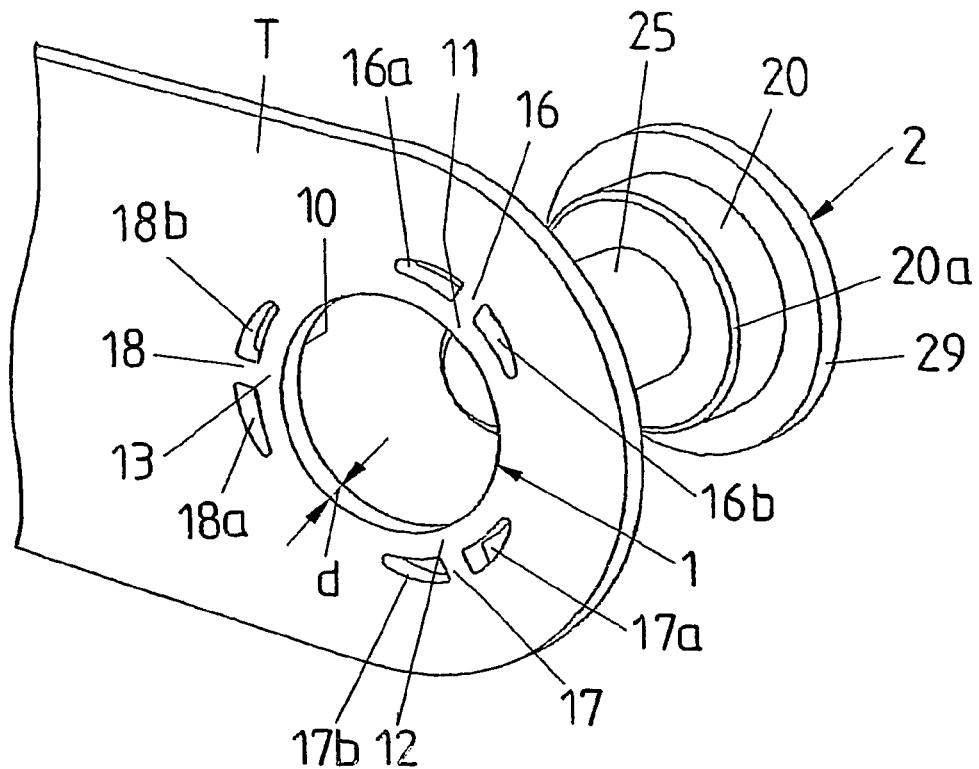
FIG. 1a is a perspective view of an adjusting lever of a motor vehicle seat with a bearing opening and an associated bearing bolt.

FIG. 1a shows a base part T in the form of an adjusting lever for a motor vehicle seat which is made e.g. from metal (sheet metal) and is to be mounted pivotally on a seat side part and which has a stamped bearing opening 1 surrounded by a circular inner edge 10. This bearing opening 1 is associated with a bearing element 2 in the form of a bearing bolt with a bearing section 20 and an insert bevel 20a from which a connecting section 25 with external thread protrudes on one side and on which a head 29 is mounted on the opposite side. The bearing section 20 serves to radially support the bearing bolt 2 on the edge 10 of the bearing opening 1 and the bearing bolt 2 can be axially supported on the adjusting lever T by the head 29. A further structural assembly of a motor vehicle seat, such as eg a seat side part to be connected to the bearing bolt 2 can be fixed on the connecting region 25 by the external thread provided there, and in respect of which the adjusting lever T can be pivoted by the bearing arrangement 1, 2 which consists of the bearing opening 1 and bearing bolt 2.

Along the perimeter of the bearing opening 1 and slightly spaced radially therefrom are three weakened areas 16, 16a, 16b; 17, 17a, 17b and 18, 18a, 18b which are spaced out at angles of 120°. Each of the weakened areas is formed by two stamped through openings 16a, 16; 17a, 17b; 18a, 18b which extend along the perimeter of the bearing opening 1 and which each run through the entire thickness d of the adjusting lever T, as well as by a web 16, 17, 18 which runs between each two through openings. A (not yet deformed) deformation area 11, 12, 13 on the edge 10 of the bearing opening 1 extends between each weakened area 16, 16a, 16; 17, 17a, 17b; 18, 18a, 18b and the bearing opening 1. The relevant deformation area 11, 12, 13 is partially uncoupled from the adjusting lever T through the associated weakened area 16, 16a, 16b; 17, 17a, 17b; 18, 18a, 18b and thus can be deformed more easily through the forces acting radially from the outside than can the remaining areas of the edge 10 of the bearing opening 1. In other words the deformation areas 11, 12, 13 have a lower rigidity to radially acting external forces.

Figure 1B:
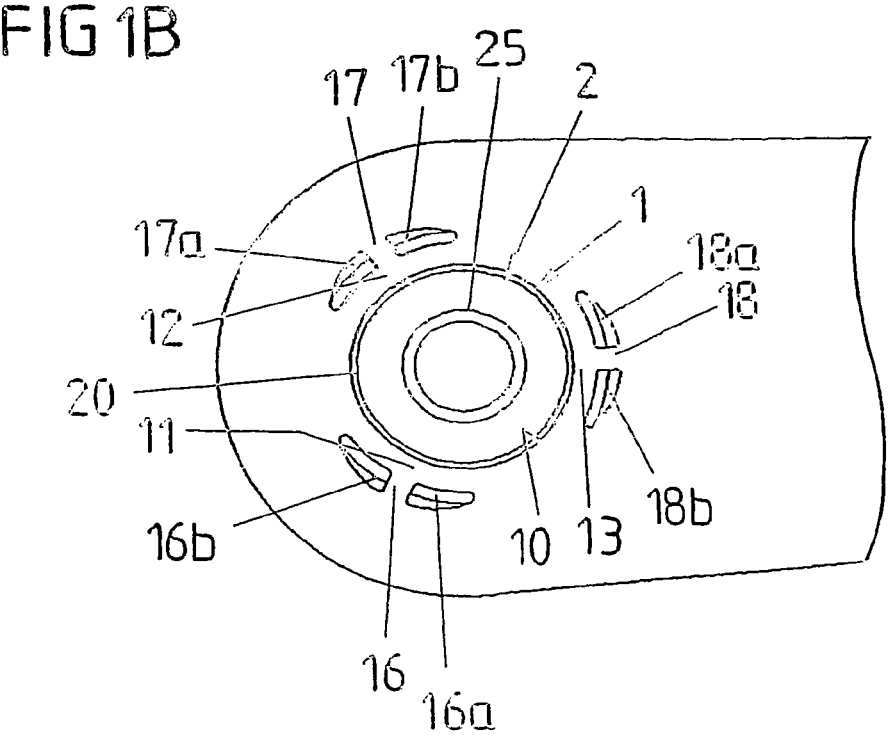
FIG. 1b is a plan view of the bearing arrangement of FIG. 1a after insertion of the bearing bolt in the bearing opening.

FIG. 1b shows the bearing arrangement of FIG. 1a after inserting the bearing bolt 2 axially into the bearing opening 1. It can be seen that the inner diameter of the bearing opening 1 has an oversize regarding the outer diameter of the bearing section 20 of the bearing bolt 2 so that the outer wall of the bearing section 20 is spaced from the inner edge 10 of the bearing opening 1 in the radial direction (forming a so-called bearing space). The edge 10 of the bearing opening 1 thus still does not form a play-free radial bearing for the bearing section 20 of the bearing bolt 2.

For this however according to FIG. 1c by a tool, e.g. through pressing the webs 16, 17, 18 forces F acting radially relative to the bearing opening 1 are exerted on the deformation areas 11, 12, 13 of the edge 10 of the bearing opening 1 so that the deformation areas 11, 12, 13 deform radially inwards, bear against the outer perimeter of the bearing section 20 of the bearing bolt 2 and radially support same in the manner of a radial bearing. The introduction of the radially acting forces into the relevant deformation area 11, 12, 13 is thereby through the web 16, 17, 18 of the associated weakened area 16, 16a, 16b; 17, 17a, 17b; 18, 18a, 18b so that the relevant deformation area 11, 12, 13 protrudes inwards in its part lying radially in front of the relevant web 11, 12, 13, see also the exploded view in FIG. 1d.

FIGS. 2a and 2b show a modification the bearing arrangement of FIGS. 1a to 1d in which the sheet metal part forming the adjusting lever T has a greater thickness d than in the embodiment according to FIG. 1 and the deformation areas 14 extend only over a part of the thickness d of the sheet metal part. The deformation areas 14 already protruding inwards radially from the edge 10 of the bearing opening 1 were formed as a result of the creation of recesses 19 in the form of material displacement points close to that edge 10 and do not pass completely through the adjusting lever T but only engage to a depth t<d therein.

An essential difference here compared with the bearing arrangement of FIGS. 1a to 1d is that the deformation areas 14 already form radially inwardly directed projections before the bearing bolt 2 is inserted in the bearing opening 1. These projections protrude so far inwards that in this case the outer perimeter of the bearing section 20 of the bearing bolt 2 has an oversize regarding the inner surround of the bearing opening taking into account the radially inwardly directed projections which are formed through the deformation areas 14.

Consequently here when inserting the bearing bolt 2 with its bearing section 20 with bevel 20a (from the back of the deformation areas 14) into the bearing opening 1 and on screwing it with its threaded section 25 into an associated structural assembly the deformation areas 14 on the edge 10 of the bearing opening 1 are displaced radially outwards in part until the bearing section 20 of the bearing bolt 2 and the inwardly directed projections 14 of the edge 10 of the bearing opening 1 form a close fit which ensures the desired radial support and bearing of the bearing section 20 in the bearing opening 1.

With both the embodiments of a bearing arrangement described above the smooth running or sluggish movement of the bearing bolt 2 in the bearing opening 1 is determined each time through the number and stiffness of the deformation areas through which the bearing bolt 2 can be supported radially with its bearing section 20. The closer the recesses 19 (material displacement spots) lie to the edge of the bearing opening so the more marked their action is as weakened areas (spring back deformation areas). With the bearing arrangement illustrated in FIGS. 2a to 2c the axial depth t of the deformation areas 14 is decisive for this.

With the bearing arrangements illustrated in FIGS. 1a to 1d and 2a to 2c the deformation areas are each distributed over the entire circumference of the relevant bearing opening 1. This is conditioned in that here the relevant bearing bolt 2 fixed on a seat side part forms a fixed element of the bearing arrangement and the adjusting lever T is pivotal relative to the bearing bolt so that depending on the swivel position of the adjusting lever T different areas of the edge 10 of the bearing opening 1 are loaded more through the weight forces introduced through the adjusting lever T (weight of the seat part to be adjusted through the adjusting lever T e.g. a seat trough, as well as where applicable a passenger seated thereon). The deformation areas are therefore spread out uniformly along the perimeter of the bearing opening 1 so that an even radial support of the bearing bolt 2 in the bearing opening is guaranteed independently of the pivotal position of the bearing lever T.

Figure 3A:
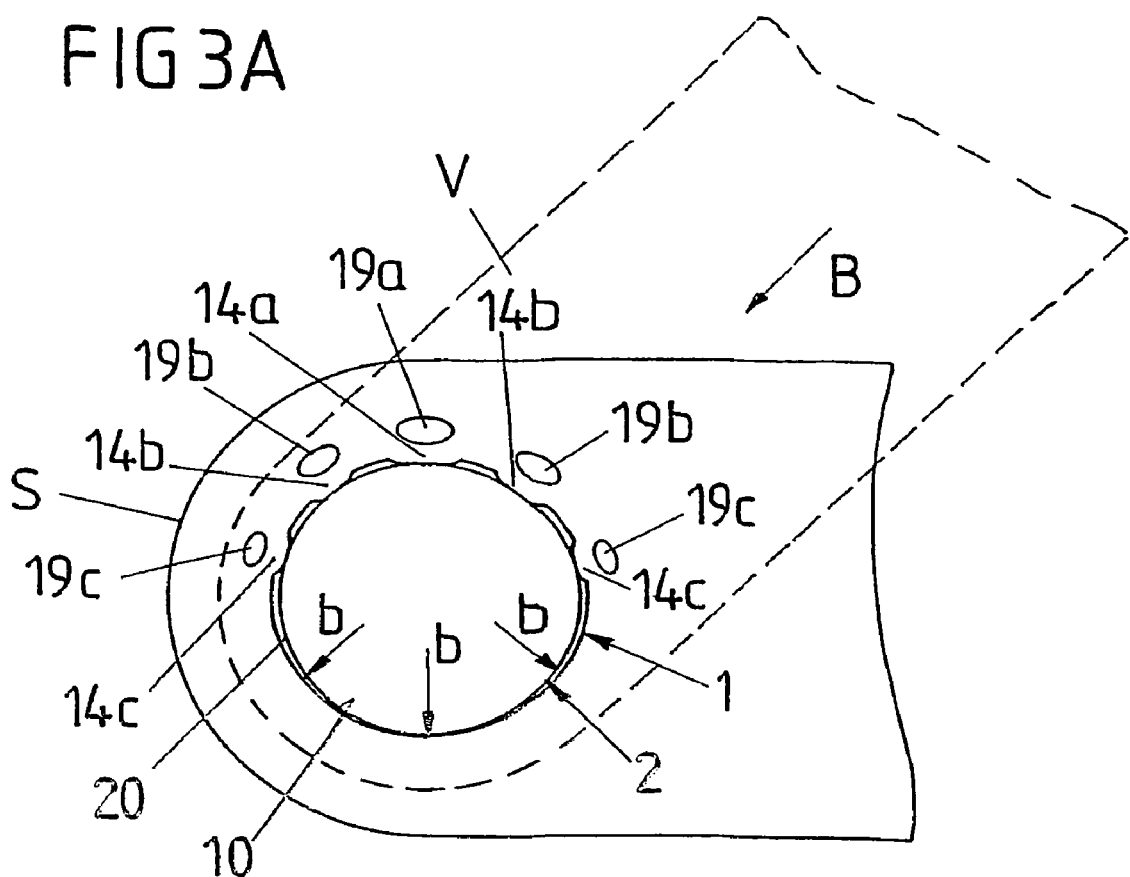
FIG. 3a is a modification of the bearing arrangement of FIGS. 1a to 1d and 2a to 2c regarding the design of the bearing opening in a seat side part.

FIG. 3a shows a bearing arrangement in which the bearing opening 1 is provided in a seat side part S mounted rotationally secured and the bearing bolt 2 is mounted pivotally in the bearing opening 1. An adjusting lever V of a seat adjusting device is connected rotationally secured to the bearing bolt 2 and during rotational movement of the bearing bolt 2 is pivoted together with same. If in this case the adjusting lever V is stressed mainly with weight forces B which act along a direction from top to bottom then the edge 10 of the bearing opening 1 is mainly loaded in its lower region through corresponding forces b exerted by the bearing bolt 2. In this case it is advantageous to provide the deformation areas 14a, 14b, 14c and consequently the associated weakened areas 19a, 19b, 19c mainly in the upper less stressed area of the edge 10 of the bearing opening 1, as can be seen in FIG. 3a.

Figure 3B:
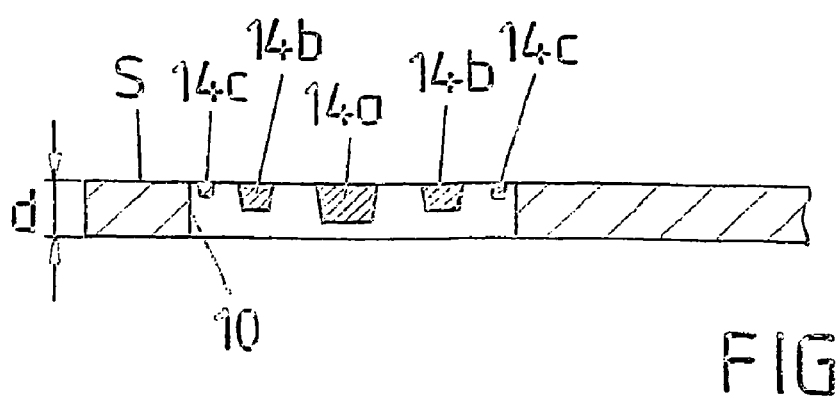

It is furthermore apparent from FIGS. 3a and 3b that the weakened areas 19a, 19b, 19c in the form of material displacement areas (recesses) and the deformation areas 14a, 14b, 14c each extend over different parts of the thickness d of the seat side part S, see in particular FIG. 3b. The weakened areas 19a, 19b, 19c thereby vary both in respect of their cross-sectional extension and in respect of their depth in the axial direction of the bearing opening 1.

The assembly of the bearing arrangement is carried out similar to the embodiment of FIGS. 2a to 2c, i.e. first inwardly projecting deformation areas 14a, 14b, 14c are produced on the edge 10 of the bearing opening 1 by providing weakened and material displacement areas 19a, 19b, 19c and then the bearing bolt 2 is inserted into the bearing opening 1 whereby the deformation areas are partially displaced (deformed back) so that the material flows axially and/or circumferentially away as well as is set back into the material displacement areas.

Figure 4A:
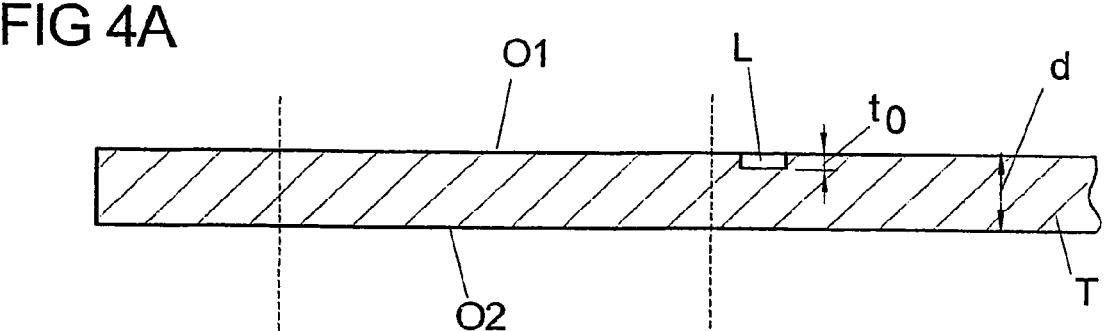
FIG. 4a is a first chart which illustrates a method for manufacturing a bearing opening having a deformation area on the edge of the bearing opening symmetrical relative to a centre plane of the bearing opening.

FIG. 4a shows a sheet metal part T of the thickness d between two surfaces O1, O2 which can be for example an adjusting lever for a seat part which is to be adjusted. According to FIG. 4b a bearing opening 1 defined by an edge 10 of circular cross-section is to be formed in this sheet metal part T. Before producing the bearing opening 1 however according to FIG. 4a at least one blind hole L, preferably a number of blind holes L, is/are produced close to the edge 10 of the subsequent bearing opening 1, namely outside of the bearing opening, with a non stock removal process, e.g. by an impression stamp, with the depth to of the blind holes preferably corresponding to 20 to 30% of the thickness d of the sheet metal part T. Then first the bearing opening 1 is produced in the sheet metal part T (see FIG. 4b) and then through pressure on the base of the blind hole L a weakened area S is created in the form of a material displacement point of the depth t whereby the displaced material creates a radially inwardly projecting deformation area D on the edge 10 of the bearing opening 1. This deformation area D is formed symmetrical relative to the centre plane M of the bearing opening 1 (perpendicular to the plane axial to the bearing opening) and has, viewed in the axial direction of the bearing opening 1, at its ends non-deformed sections N which directly adjoin the relevant surface O1, O2 of the sheet metal part T.

Figure 4B:
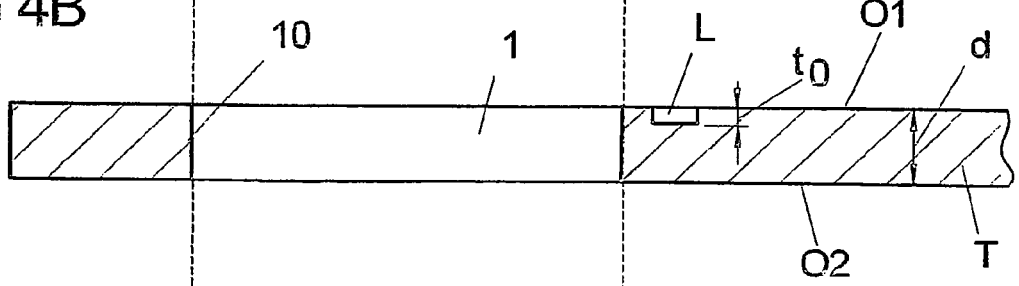
FIG. 4b is a second chart which illustrates the method for manufacturing a bearing opening having a deformation area on the edge of the bearing opening symmetrical relative to a centre plane of the bearing opening.
Figure 4C:
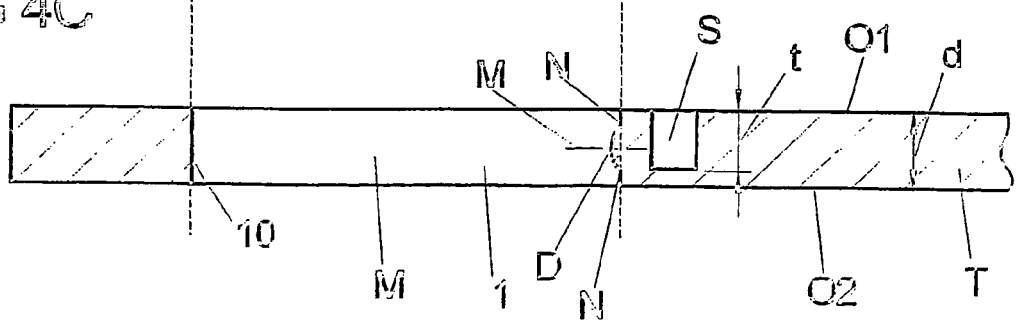
FIG. 4c is a third chart which illustrates the method for manufacturing a bearing opening having a deformation area on the edge of the bearing opening symmetrical relative to a centre plane of the bearing opening.

The method illustrated in FIGS. 4a to 4c is based on the technical principle of creating in a base part prior to forming a bearing opening close to the subsequent edge of this bearing opening at first at least one blind hole, preferably several blind holes along the perimeter of the subsequent bearing opening, then introducing the bearing opening into the base part and finally creating the desired radially inwardly projecting deformation areas on the edge of the blind hole through additional material displacement in the region of the blind hole by using a suitable tool, e.g. a stamp, to act on the blind hole.

The central deformation areas D produced hereby have as a result of their symmetrical design relative to the centre plane M of the bearing opening 1 and relative to their change in the axial direction into a non-deformed section N the advantage that when assembling a bearing arrangement the relevant bearing element (bearing bolt) can be inserted into the bearing opening from both sides, thus selectively from the one surface O1 or from the other surface O2 of the base part T. It is hereby not necessary to keep different variations of the base part provided with a bearing opening ready for different uses (depending on the insert direction of the bearing element into the bearing opening) but rather one and the same type of base part can be used irrespectively of the insert direction of the bearing bolt (no different "right and left hand varieties").

Figure 5A:
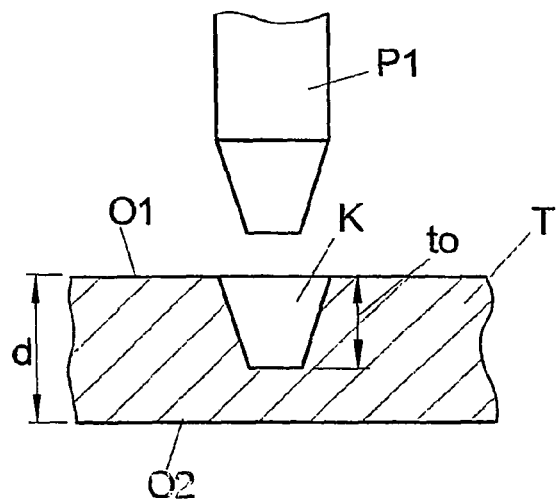
FIG. 5a shows a first modification of the method of FIGS. 4a to 4c.
Figure 5B:
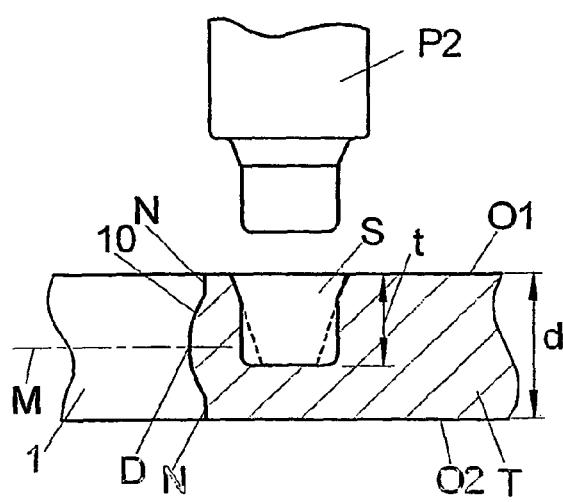
FIG. 5b shows a first modification of the method of FIGS. 4a to 4c.

Whereas with the embodiment illustrated in FIGS. 4a to 4c the deformation area D is created through action on the base of the blind hole L, with the embodiment illustrated in FIGS. 5a and 5b this happens through action on the side boundary walls of a conical blind hole K.

The conical blind hole K of a depth $t_o$ is created by a first conically extending impression stamp P1, see FIG. 5a. After a bearing opening is formed in the sheet metal part T the conical blind hole K is then widened out by a second impression stamp P with a cylindrical impression region so that a cylindrical weakened area S is formed in the manner of a material displacement point. The displaced material serves to produce a deformation area D on the edge 10 of the bearing opening 1 which projects radially inwards from this edge and has non-deformed sections N at its ends. This is also a central deformation area D which is designed symmetrical relative to the centre plane M of the bearing opening 1.

Figure 6A:
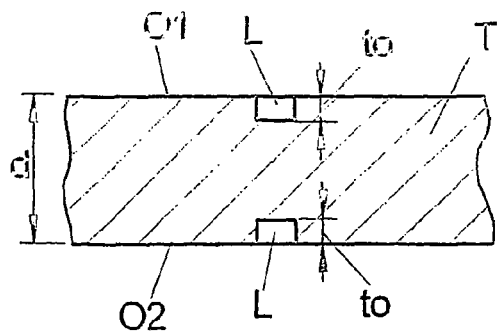
FIG. 6a shows a second modification of the method of FIGS. 4a to 4c.
Figure 6B:
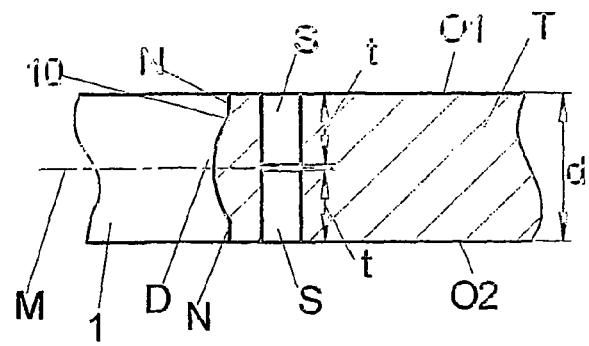
FIG. 6b shows a second modification of the method of FIGS. 4a to 4c.

With the variations illustrated in FIGS. 6a and 6b before introducing a bearing opening two opposing blind holes L are formed in the sheet metal part T close to the subsequent edge 10 of the bearing opening 1 and each directed with the depth $t_o$ from one of the two surfaces O1, O2 towards the inside of the sheet metal part T of thickness d, see FIG. 6a. The bearing opening 1 defined by the edge 10 is then first created and then material is displaced from the two blind holes to form a weakened/material displacement area S by exerting pressure through a suitable stamp onto the base of the relevant blind hole L. The displaced material forms according to FIG. 6b a central deformation area D on the edge 10 of the bearing opening 1 which protrudes radially inwards and changes axially towards the surfaces O1, O2 of the sheet metal part T into non-deformed sections N, see FIG. 6b. Several such weakened/material displacement areas S can obviously be spaced out (uniformly) in pairs opposite one another along the perimeter of the bearing opening 1.

The variation illustrated in FIGS. 6a and 6b has the advantage that as a result of the action from both sides onto the sheet metal part T, from the two surfaces O1, O2, a particular accuracy is to be anticipated when producing a symmetrical central deformation area D.

The invention claimed is:

1. A bearing arrangement for an adjusting device in a motor vehicle comprising:
    a bearing point in the form of a bearing opening of a base part; and
    a bearing element engaging the base part through the bearing opening;
    wherein the base part has on the edge of the bearing opening at least one deformation area which as a result of plastic deformation protrudes radially inwards from the edge and acts as a radial support for the bearing element;
    wherein the base part is pivotable relative to the bearing element;
    wherein the deformation area is associated with at least one weakened area of a component part on the side of the deformation area remote from the bearing opening;
    wherein the deformation area is associated with two partial areas of a weakened area separated from each other by a web; and
    wherein the deformation area lies between the web and the bearing opening.

2. The bearing arrangement according to claim 1, wherein the at least one deformation area has in comparison to areas of the edge of the bearing opening without the at least one deformation area a lesser rigidity in respect of radially acting forces.

3. The bearing arrangement according to claim 1, wherein the deformation area is formed symmetrical relative to a central plane of the bearing opening and configured to change axially at its two ends into radially protruding sections on the edge of the bearing opening.

4. The bearing arrangement according to claim 1, wherein several deformation areas are arranged in succession along at least a part of the perimeter of the edge of the bearing opening.

5. The bearing arrangement according to claim 4, wherein the deformation areas are spread out round the entire perimeter of the bearing opening.

6. The bearing arrangement according to claim 4, wherein the deformation areas are disposed along that part of the perimeter of the edge on which during operation of the bearing arrangement comparatively lower radial forces act.

7. The bearing arrangement according to claim 4, wherein each deformation area is associated with a weakened area of a component part on the side of the deformation area remote from the bearing opening.

8. The bearing arrangement according to claim 7, wherein the weakened area of each deformation area comprises at least one recess of the component part.

9. The bearing arrangement according to claim 8, wherein the recess is formed as a through opening.

10. The bearing arrangement according to claim 8, wherein the recess is defined by a material displacement area in the form of a blind hole.

11. The bearing arrangement according to claim 8, wherein an extension of the deformation area in the axial direction of the bearing opening corresponds with one of the depth and width of the recess.

12. The bearing arrangement according to claim 7 wherein the recesses have different depth in the axial direction of the bearing opening.

13. The bearing arrangement according to claim 1, wherein the at least one weakened area extends along the edge of the bearing opening.

14. The bearing arrangement according to claim 1, wherein the bearing arrangement is configured to support an adjusting element of an adjusting device for a motor vehicle seat on a supporting seat part.

15. The bearing arrangement according to claim 14, wherein the adjusting element is an adjusting lever.

16. The bearing arrangement according to claim 14, wherein the supporting seat part is a seat side part.

17. The bearing arrangement according to claim 1, wherein the bearing element is configured as a bearing bolt.

18. The bearing arrangement according to claim 17, wherein the bearing bolt has a bearing section as well as a connecting section.

* * * * *